United States Patent [19]

Ichihara et al.

[11] Patent Number: 4,926,249

[45] Date of Patent: May 15, 1990

[54] COLOR IMAGE READER HAVING A LENS AND PRISM INCORPORATED INTO A SINGLE UNIT

[75] Inventors: Yoshiyuki Ichihara; Kunio Ito; Tadashi Izawa; Norihiro Wakui, all of Hachioji, Japan

[73] Assignee: Konica Corporation, Tokyo, Japan

[21] Appl. No.: 209,416

[22] Filed: Jun. 20, 1988

[30] Foreign Application Priority Data

Jun. 23, 1987 [JP] Japan ................... 62-157006

[51] Int. Cl.⁵ .................. H04N 1/028; H04N 1/46; H04N 9/097
[52] U.S. Cl. ..................... 358/75; 358/43; 358/50; 358/55; 350/173
[58] Field of Search .............. 358/43, 49, 50, 52, 358/55, 75, 78, 80; 350/173

[56] References Cited

U.S. PATENT DOCUMENTS

| | | | |
|---|---|---|---|
| 1,497,356 | 6/1924 | Comstock | 350/173 |
| 1,722,356 | 7/1929 | Romer | 350/173 |
| 3,534,158 | 10/1970 | Eilenberger | 358/49 |
| 4,057,837 | 11/1977 | Needs et al. | 358/55 |
| 4,275,412 | 6/1981 | Contant | 358/55 |
| 4,591,901 | 5/1986 | Andrevski | 358/50 |
| 4,623,916 | 11/1986 | Levine | 358/50 |
| 4,814,895 | 3/1989 | Harada et al. | 358/75 |
| 4,835,600 | 5/1989 | Harada et al. | 358/55 |

FOREIGN PATENT DOCUMENTS

| | | | |
|---|---|---|---|
| 118903 | 9/1944 | Australia | 350/173 |
| 0217503 | 4/1987 | European Pat. Off. | |
| 55-55685 | 4/1980 | Japan | 358/50 |
| 55-124379 | 9/1980 | Japan | 358/55 |
| 59-57562 | 4/1984 | Japan | 358/75 |
| 59-61267 | 4/1984 | Japan | 358/75 |
| 60-127863 | 7/1985 | Japan | 358/75 |
| 60-134556 | 7/1985 | Japan | 358/75 |
| 61-210061 | 10/1985 | Japan | 358/75 |

Primary Examiner—James J. Groody
Assistant Examiner—Randall S. Svihla
Attorney, Agent, or Firm—Jordan B. Bierman

[57] ABSTRACT

The invention provides an improved color image reader in which the document having a color original image is irradiated by a light source moving relatively on such document and the reflected light is introduced into a single unit including a lens and a color separator so that the color original image is separated into plural color component images. The plural color component images are respectively read and photo-electrically converted into plural signals by CCD's. In such arrangement, the light source is positioned at the upper side of the optical axis of the lens and the CCD's are disposed at the lower side of the axis. The color separator can form the plural color component images on the same plane.

6 Claims, 8 Drawing Sheets

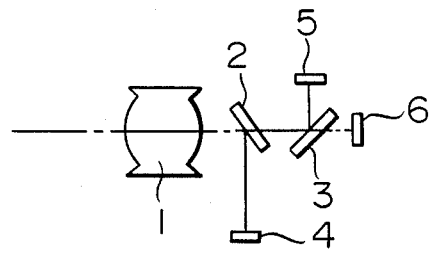
FIG.9(a) PRIOR ART
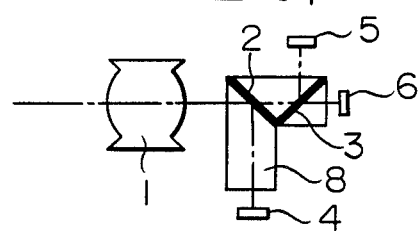
FIG.9(b) PRIOR ART
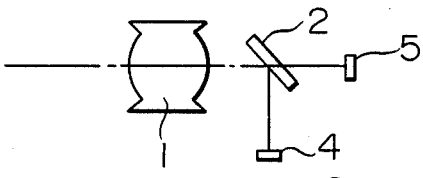
FIG.9(c) PRIOR ART
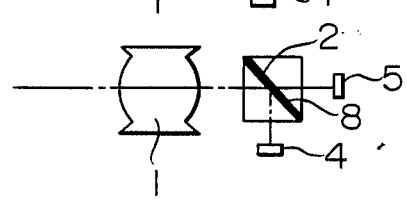
FIG.9(d) PRIOR ART
FIG. 10
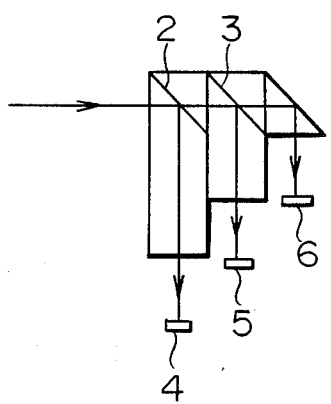

COLOR IMAGE READER HAVING A LENS AND PRISM INCORPORATED INTO A SINGLE UNIT

The invention relates to a color image reader used on a color copying apparatus and the like.

FIGS. 8 and 9 show examples of color image readers. In FIG. 8, numeral 20 represents an original document which is placed on a transparent glass platen 21. Numeral 22 represents a light source; 23, a reflector mirror; and 24, a first mirror. They are shifted as one unit in the direction shown by the arrow A. Numerals 25 and 26 represent a second and a third mirror respectively. These mirrors move as one unit in the same direction as that of the first mirror at a speed half as large as that of the first mirror. Because of the operations of the first, second, and third mirrors, light reflected from an irradiated area that moves at a constant speed on the original document is directed to a lens 1 via a constant length optical path. A luminous flux which passes through the lens 1 is color-separated by a color separator 10 and an image of each color is focused on corresponding one of linearly-arranged photoelectric conversion elements (hereinafter called CCD) 4, 5, and 6. FIG. 9 shows an example of the above color separator 10. In FIG. 9 (a), dichroic mirrors 2 and 3 are disposed on an optical path where a reflected light from the original document is separated into an image on the CCDs 4, 5, and 6 after passing the lens 1 for image formation. The dichroic mirror is an interference filter where dielectric films of low and high refraction factors are alternately placed to form multilayer on a transparent base plate such as glass plate by vacuum evaporation method. It possesses a permeability, for example, as shown in FIGS. 7 (a) and (b). When a permeability of the dichroic mirror 2 in FIG. 9 (a) is one shown in FIG. 7 (a) and that of the dichroic mirror 3 is one shown in FIG. 7 (b), the CCD 4 reads blue color data, the CCD 5 red, and the CCD 6 green. The optical lengths from the lens to each CCD are virtually equal if chromatic aberration of the lens, error of dimensional accuracy of each CCD, surface accuracy of the reflection surface of each dichroic mirror, and surface accuracy of a prism reflection surface and optical length error within a prism, if a prism is used, are not taken into consideration. FIG. 9 (b) shows an example of a configuration using a prism 8 in a 3-color separation reading apparatus. The surfaces 2 and 3 of the prism 8 have the same functions as those of the dichroic mirrors 2 and 3 in FIG. 9 (a). Therefore, the CCDs 4, 5 and 6 can obtain the same color data as those obtained in FIG. 9 (a). If a prism is used, a light goes in and out of the glass surface vertically, which eliminates astigmatsm. FIG. 9 (c) shows a 2-color separation reading apparatus without a prism and FIG. 9 (d) with a prism. The same numbers are used for the elements corresponding to those in FIGS. 9 (a) and 9 (b). These are the examples of 2-color separation reading apparatuses.

In the examples described above, the CCDs are always placed on different surfaces. This type of color separation reading apparatus requires accurate positioning of every picture element (ordinarily 7 μm□-14 μm□) of the CCD so as to prevent errors in color data. Therefore, the positioning of the CCD is strictly adjusted. More specifically, for example, the size of an image on the original document is as large as one picture element of a CCD. This image is black and projected to each CCD. If it is accurately projected on a Nth picture element of each CCD as shown in FIG. 6 (a), color data for red, blue, and green are not output and the signal is judged to be black. However, if a deviation occurs as shown in FIG. 6 (b), the Nth signal is judged to be green.

Thus, because one picture element is requested to be adjusted and fixed with the accuracy less than several μm, complicated and highly accurate adjustment is required. The CCD is usually adjusted on five axes, $\theta_A$, $\theta_B$, x, y, z, with respect to the optical axis as shown in FIG. 5. Since each CCD is adjusted on five axes, if the CCD is placed on a different surface such as above examples, it is necessary to change the adjusting direction by 90°, which requires a complicated adjusting mechanism and difficult adjusting procedure. In addition, the effect of ambient temperature difference among CCDs cannot be neglected for the parts which require such a precise positioning. For example, if the length of a CCD is 35 mm, the temperature difference higher 10° C. that other CCD will cause approx. 1 μm change in the length of CCD and approx. 2 μm in the length of ceramic base, which results in deviation of picture element. Moreover, a slight change in the length of a mounting mechanism section is also important. If the CCDs 5 and 6 are placed relatively near the light source 22 as shown in an example in FIG. 8, they will be influenced by the heat generated by the light source. Dimensional changes cause deviation of picture element, additionally, output characteristics of CCD which is a semi-conductor may fluctuate and the three CCDs may be out of balance.

SUMMARY OF THE INVENTION

It is an object of this invention to provide a color image reader which is easily assembled and free from deviation of picture element and change of color tone caused by the heat of the light source. This color image reader is arranged in such a manner that a color separator is provided on an image formation optical path so that reflected light from an original document is separated to form plural color images through a lens wherein the surface of the original document is irradiated by a light source which moves relatively on such a surface.

A plurality of color images are formed in this way. In this apparatus, the said light source is positioned above the optical axis of the said lens and the said plurality of color images are formed below the optical axis of the above lens and substantially in the same irradiation direction.

Each CCD is positioned adjacent to each other away from the light source. This arrangement minimizes influence of heat and prevents deviation of picture elements caused by thermal distortion. Moreover, change of color tone due to unbalanced CCD output can also be prevented.

BRIEF DESCRIPTION OF THE DRAWINGS

FIGS. 2, 3, 4, and 10 are sectional views of color separators of the first, second, third, and fourth embodiments according to this invention. FIGS. 9 (a)–9 (d) are sectional views of color separator used for the color image reader of FIG. 8. FIGS. 10 through 15 are perspective views illustrating constitution of color separating means according to the invention.

DETAILED DESCRIPTION OF THE INVENTION

Figure 1:
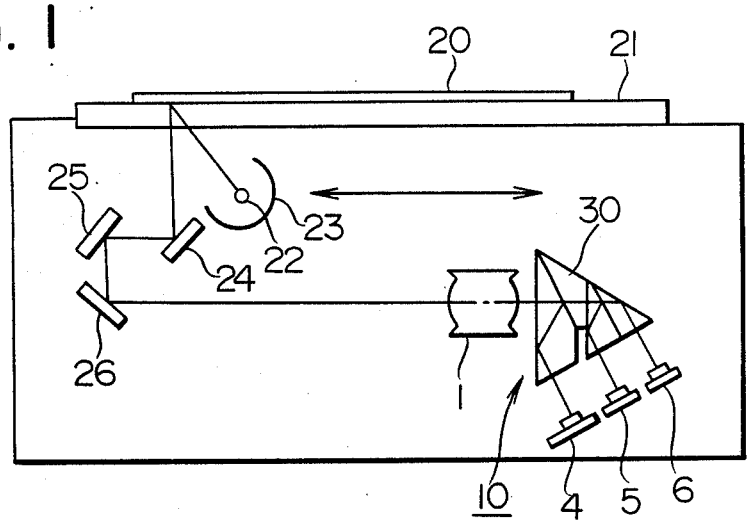
FIG. 1 is a sectional view of an embodiment of a color image reader of this invention.
Figure 2:
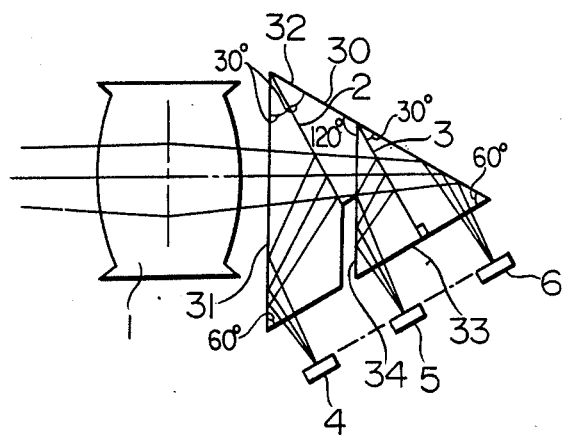
Figure 3:
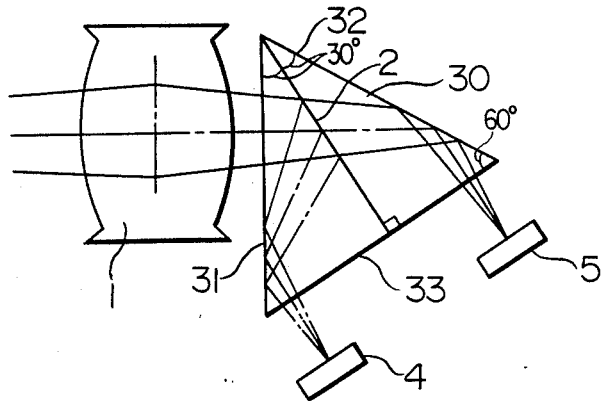
Figure 4:
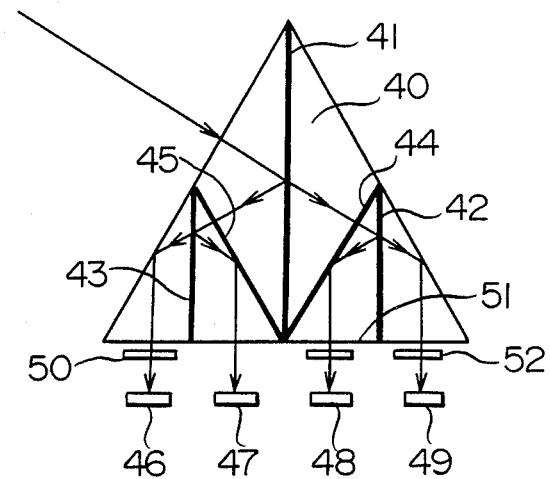
Figure 7A:
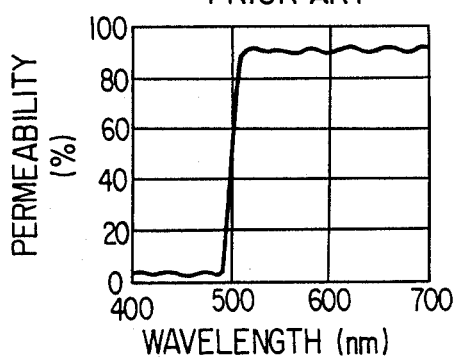
FIGS. 7 (a)-7 (b) spectral permeability of dichroic mirror.
Figure 7B:
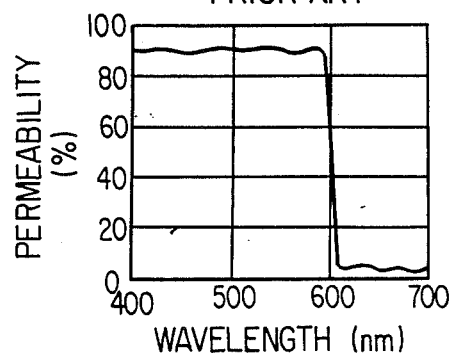
Figure 8:
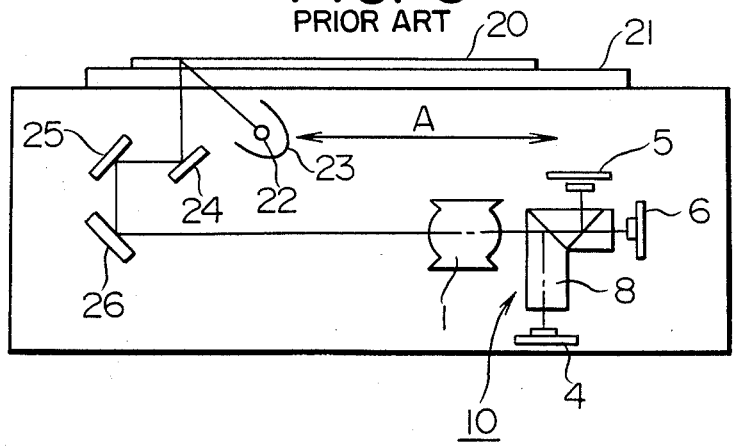
FIG. 8 is a sectional view of a color image reader not having an improvement according to the invention.

FIG. 1 shows an embodiment of the present invention. Its general composition is the same as that of a comparative example as shown in FIG. 8 except for the color separator. The like numerals are used for the like elements for FIG. 1 and FIG. 8. As previously described regarding the comparative example, each reflected light on the original document irradiated by light source (halogen lamp) is color separated on the CCDs 4, 5, and 6 to form an image. FIGS. 2, 3, and 4 show various embodiments of color separators. In the first embodiment shown in FIG. 2, numeral 1 represents a lens, 30 a color separation prism, and 4, 5, and 6 a CCD. Dichroic mirrors with spectral permeability shown in FIGS. 7(a) and 7(b) are installed respectively on the surfaces 2 and 3 of the prism 30. After passing through the lens 1, a light goes into the prism surface 31 almost vertically. Then the light is separated by the dichroic mirror 2 and the light of blue component (wave length 400–500 nm) is reflected and directed to the surface 31. The light of blue component is totally reflected on the boundary between the glass surface 31 and air phase, and goes out of the surface 33 almost vertically to form an image on the CCD 4. On the other hand, the light which passes through the dichroic mirror 2 (wave length 500–700 nm) goes straight into the prism and reaches the dichroic mirror 3. The light of red component with the wave length of 600 to 700 nm is reflected here and directed to the surface 34. The light of red component is totally reflected on the boundary between the glass surface 34 and air phase, and goes out of the surface 33 almost vertically from this surface to form an image on the CCD 5. The light of green component with the wave length of 500 to 600 nm which goes through the dichroic mirror reaches the surface 32, is totally reflected on the boundary between air phase and the glass surface, and goes out of the surface 33 almost vertically from this surface to form an image on the CCD 6.

A color separation prism with the above configuration can easily be obtained by attaching a plurality of ground prisms having a face-to-face angle shown in the figure. The prism 30 is made to form a large equilateral triangle with surfaces 31, 32, and 33. In this way, optical lengths within the glass are all equal and the length equals to the height of the large equilateral triangle of the prism 30. It may be easily understood that by using such a prism, it is possible to form light images substantially on the same surface in which the light images are separated from an image into three colors.

In the second embodiment shown in FIG. 3, the rear part of equilateral triangle consisting of surfaces 34, 33, and 32 is taken out of the prism 30 shown in FIG. 2 and applied to the 2-color separation reading apparatus. This example shows a case of reduced number of color to be separated by eliminating a part of the configuration shown in FIG. 2. It is apparent that addition of configuration parts, on the contrary, will enable color separation to increase more than four colors. FIG. 4 shows the third embodiment. In a prism 40 of equilateral triangle, half mirrors 41, 42 and 43 which are at right angle to one surface and half mirrors 44 and 45 which are in parallel with other surfaces are provided. A light goes vertically into one surface, is separated into four colors, and goes out of another surface vertically. If blue, green, and red filters, 50, 51, and 52, are provided where reflected lights go out, the CCDs 46, 48, and 49 ahead of these filters respectively obtain blue, green, and red image data. The CCD 47 without a filter obtains black image data.

Above embodiments all employ color separation prism. However, the invention is not limited to this application. If astigmatism is not regarded as a problem, dichroic mirror and reflection surfaces entirely made of sheet glass can also be used.

FIG. 10 is a sectional view of the fourth embodiment in which image formation surfaces of CCDs are not positioned on the same surface but directions of lights which come out of the prism are the same.

Figure 5:
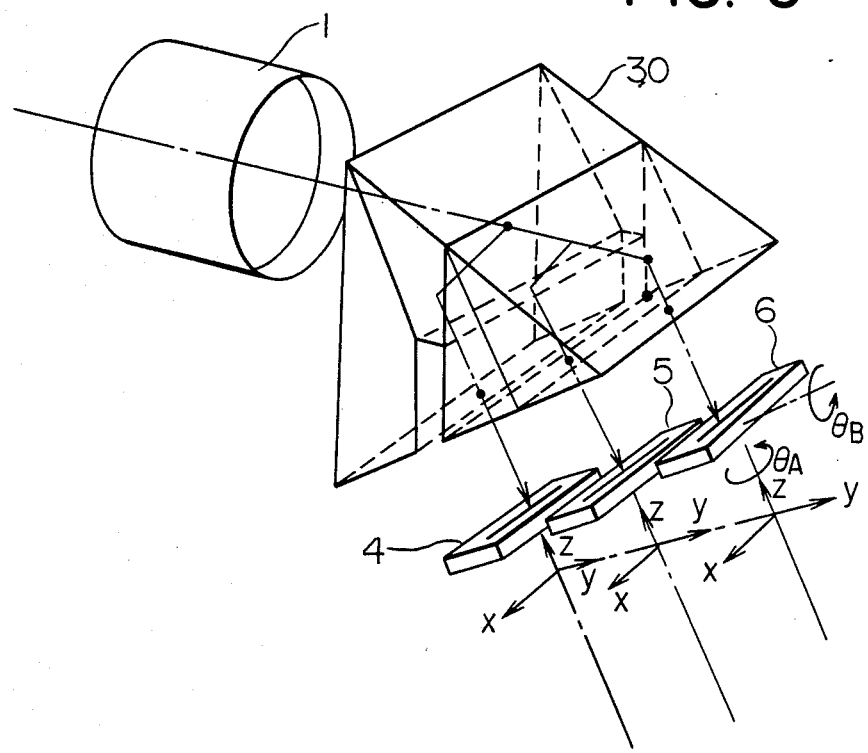
FIG. 5 is a perspective side view of adjusting direction of CCD of an embodiment according to this invention.
Figure 6:
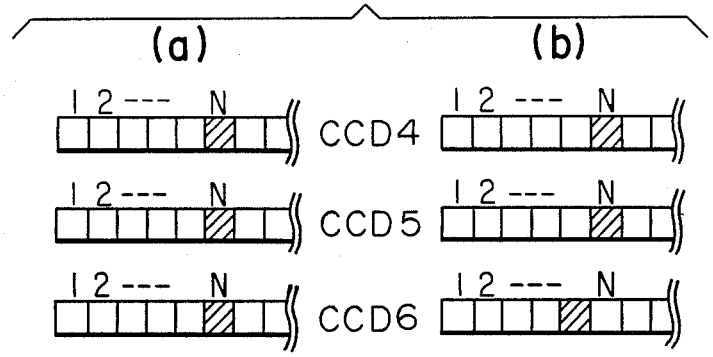
FIG. 6 is a diagram of picture elements of each CCD.

When light images are obtained in the same irradiation direction, after color separation, the following effects occur: As shown in FIG. 5, three CCDs 4, 5, and 6 cannot accomplish positioning of picture elements without five axes adjustment on each CCD as previously mentioned. If the focusing direction of light image of each color is the same, each CCD can be positioned in the same direction. Therefore, for example, following adjustment may be applicable. Only one set of 5-axis adjusting mechanism is prepared and the CCD 4 is adjusted first. Then the CCD 4 is fixed with an adhesive via a supporting mechanism which is not shown in the figure of the prism 30. Next, the 5-axis adjusting mechanism is shifted using a y-axis and/or z-axis adjusting mechanism to the position of the CCD 5. Since the CCD 5 is almost aligned with the CCD 4, only fine adjustment is necessary. Thus, the time required for adjustment can be shortened. After adjustment is made, the CCD 5 is fixed to the prism 30 with an adhesive in the same manner. The CCD 6 is handled in the same way as in the case of the CCD 5. It is obvious that these procedures require only one adjusting mechanism to realize easy adjustment. If image formation surfaces are not in the same irradiation direction, this type of simplified adjusting mechanism cannot be used. It is necessary to provide adjusting mechanism for every direction.

Moreover, if CCDs are positioned on the same surface, adjustment can be further simplified. By upgrading the accuracy of the prism, only one adjustment procedure will be required with three CCDs precisely positioned on the same base plate or package.

The above adjustment is made by indicating signal waves from the three CCDs on an oscilloscope and adjusting 5 axes to synchronize the signals based on a standard chart. Since each CCD, in this invention, is positioned adjacent to each other away from the light source, it is free from the influence of the heat and deviation of picture elements due to thermal distortion can be prevented. Moreover, changes of color tone caused by unbalanced output from each CCD can be prevented.

Next, the structures of a lens, prism, and CCD, according to this invention, which are used on the color image reader shown in FIG. 1 are described below.

Figure 11:
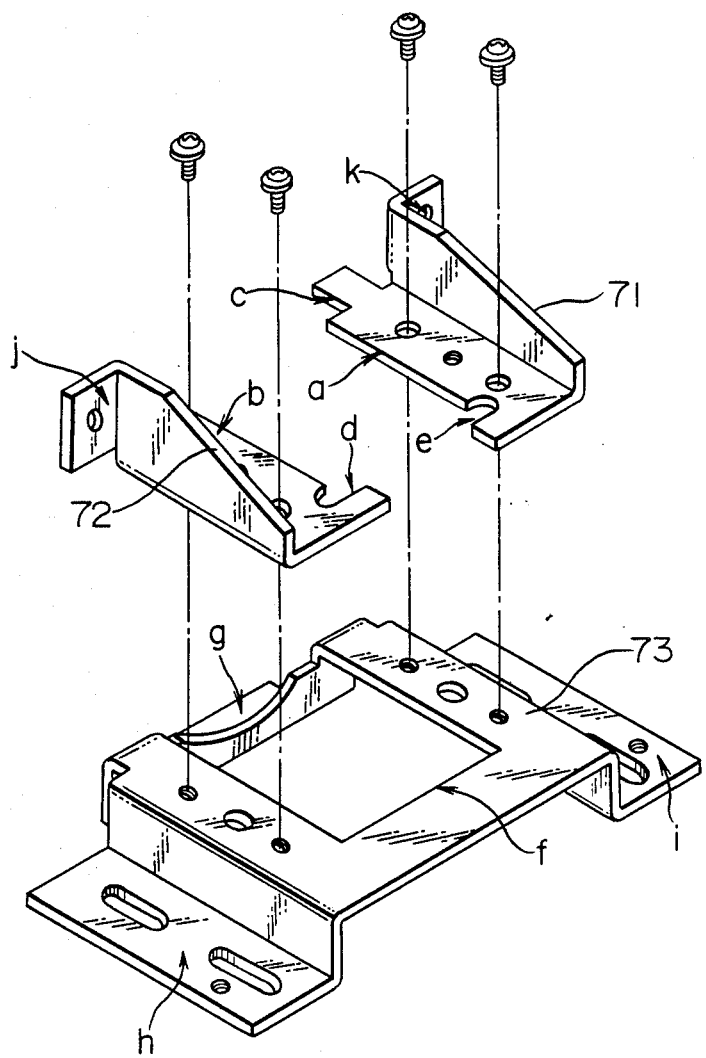

FIG. 11 shows an example of a frame on which a lens and a prism are fixed. Members 71, 72, and 73 are made of sheet metal or the like. The members 71 and 72 are secured onto the member 73 with screws.

The functions of each part of the members are as follows: Edges a and b of the members 71 and 72 retain a lens barrel. Accordingly, the edges a and b are positioned by a jig and fixed with screws in such a manner that they are parallel with each other with a distance smaller than the outer diameter A of the lens barrel, and that they are at a right angle to an edge f of the member 73. When the edges a, b, and f are arranged in this way to support the cylindrical lens barrel, a position of the lens along the longitudinal axis is defined by the edge f, while the height and inclination of optical axis relative to surfaces h and i can be defined by the edges a and b.

Edges e and d of the member 71 and 72 are positioned by a jig and fixed with screws so that they are on a plane common with the edge f of the member 73. A prism fixing member is installed later onto faces k and j of the members 71 and 72. These faces j and k are bent in advance so that they can precisely maintain the respective distances from d and e in order to minimize uneveness in a load that is exerted on the horizontally lateral sides of the prism. This arrangement ensures that the lens front (the edge f of the member 73 and the edges e and d of the members 71 and 72) is exactly parallel with the plane defined by faces j and k, and it also minimizes uneveness in a load with which the prism is pressed on the lens.

The positional relation between the edge c of the member 71 and the lens retaining edge a is predetermined by a sheet metal punching process, and the precise positional relation between these two edges is ensured. The side face of the prism is placed in contact with the edge c in order to establish positioning reference. Thus, the prism is accurately aligned with the optical axis of the lens, relative to a latitudinal direction.

Figure 14:
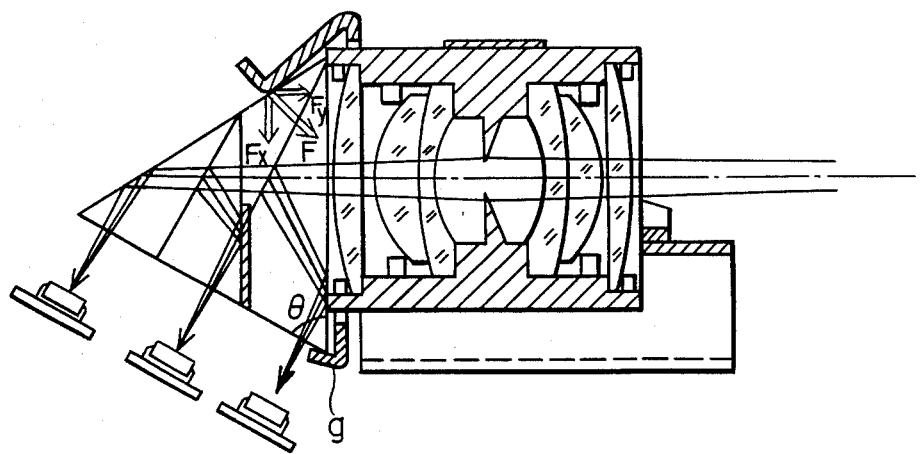

A face g of the member 73 serves as a position defining face to determine the vertical condition of the prism as shown in FIG. 14.

Figure 12:
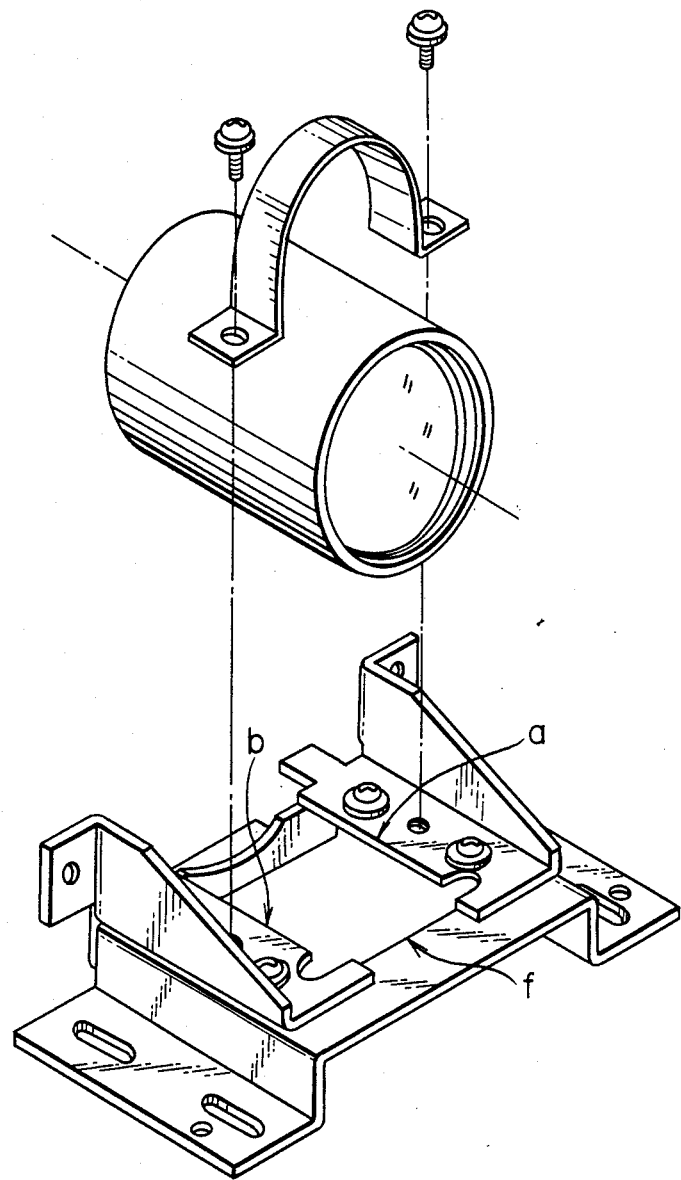

FIG. 12 shows that the lens is engaged into the frame unit which is assembled as described with FIG. 11, and the lens is secured with a band and screws. The lens is positioned by the faces a, b, and f and then secured with screws.

Figure 13:
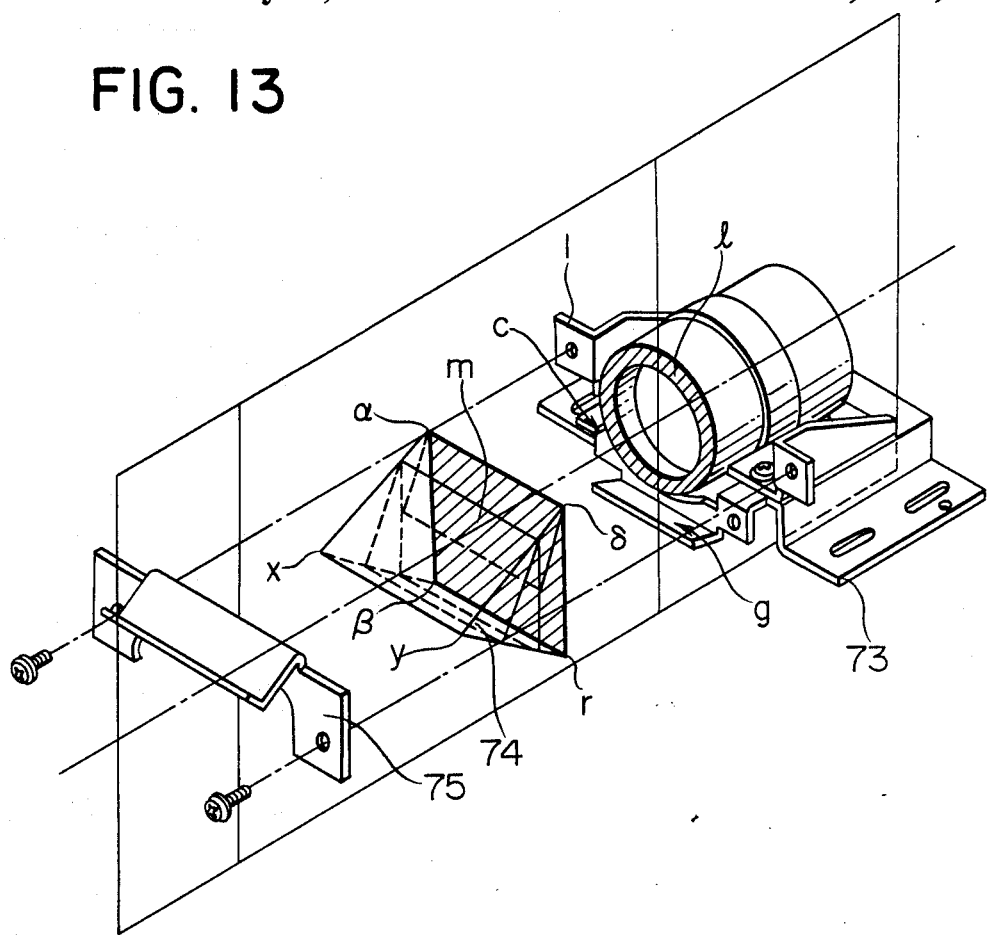

FIG. 13 shows a procedure according to which the prism is installed onto the frame unit to which the lens has been secured with screws.

The rear lens frame 1 (shadowed area) is accurately located relative to the optical axis of the lens. The incidence surface m ($\Box \alpha\beta\gamma\delta$) of the prism is pressed against the shadowed area 1. The side $\overline{\beta\gamma}$ of the prism is supported by the face g of the metal member 73, thereby the vertical condition thereof is defined. The side of the prism $\alpha\beta$ is set on the edge C of the metal member 71 to ensure transversally positioning.

When the above steps are complete, the face $\alpha x y \delta$ is pressed and fixed with the prism presser 75 and secured with screws.

FIG. 14 is a sectional view of the prism 4 fixed on the frame unit with the prism presser 75 and secured with screws.

The face g of the metal member 73 is slightly bent upward. This angle can arbitrarily selected as far as it is larger than the angle $\theta$ of the prism and smaller than 90°. The prism can be fixed more securely if g is slightly bent upward. The prism presser 75 is fixed to press the prism with the force F. Therefore, the prism is fixed while being pressed onto the lens barrel and to the face g by its components Fx and Fy.

FIG. 14 shows an optical path through a lens, prism, and CCDs.

Figure 15:
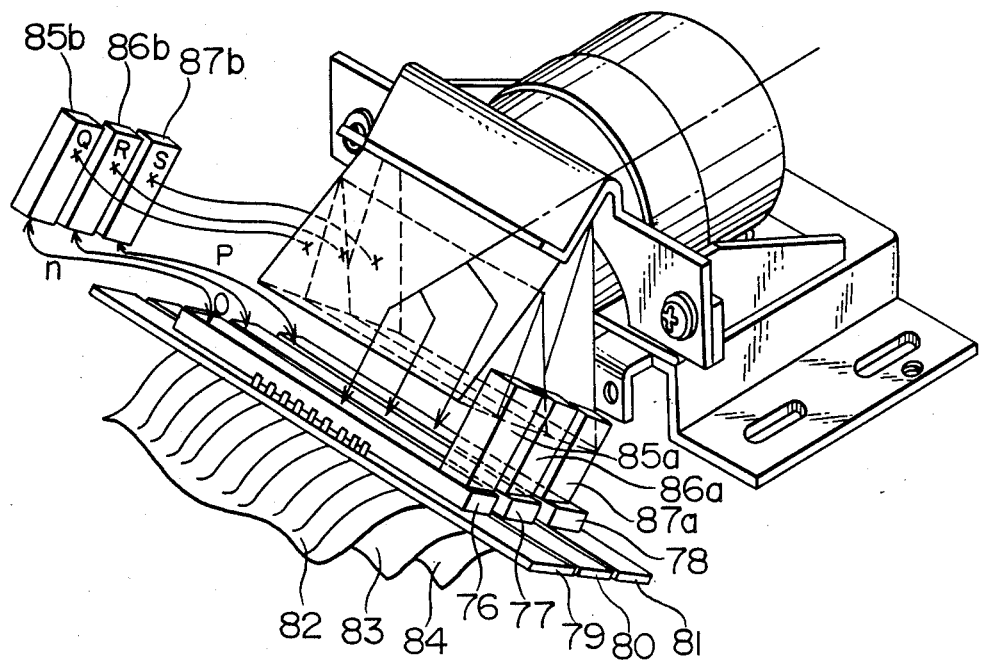

FIG. 15 shows the procedures to mount three CCDs onto the prism that has been installed onto the lens. Numerals 76, 77, and 78 represents CCD packages; 79, 80, and 81, interface PCBs for electrically driving these CCDs; and 82, 83, and 84, flexible PCBs for supplying signals and power to the interface PCBs.

The relative positions of the three CCDs to the prism are adjusted, based on the image information entered from the lens, by an unshown precision stage for adjustment, thereby the positions of the three CCDs are fixed and they are bonded via fixing arms 85a, 85b, 86a, 86b, 87a, and 87b which are respectively made of glass.

As shown by the examples of left-side arms, an adhesive is applied to spots Q, R, and S marked with X respectively on the arms 85b, 86b, and 87b. These spots are fixed to the spots marked with X on the side of the prism. At the same time, an adhesive is applied to the bottoms of the arms that are correspondingly bonded to the faces n, o, and p on the CCD packages. The arms 85a, 86a, and 87a on the right side show a view where the arms and the CCD packages have been bonded. Once bonding is complete, the CCD packages are released from the unshown precision stage for adjustment. Then, the work for forming a unit is complete.

Thus, a 3-color separation unit with a simple structure and high positioning accuracy can be obtained.

What is claimed is:

1. A color image reading apparatus comprising a light source adapted to move relative to an original document whereby said document is illuminated, a mirror means for reflecting light from the illuminated document to a lens, said light source being disposed on a first side of the optical axis of said lens, said lens focusing the reflected light to form an image, a prism disposed in the optical axis of said lens, said prism separating the reflected light into a plurality of color lights, and a plurality of photo-electric conversion means corresponding in number to the plurality of color lights, said prism having surfaces for diverting said color lights to said plurality of photo-electric conversion means to form a plurality of color images, said plurality of color lights being diverted in substantially the same direction so that said plurality of photo-electric conversion means are disposed on a second side of the optical axis of said lens, said lens and said prism being assembled as a single unit comprising:

said lens incorporated into a lens housing, said prism, a stop means for positioning said prism, said stop means being fixed to said lens housing and being adapted to come into contact with an edge of said prism, a light projecting end surface of said lens housing adapted to come into contact with a first surface of said prism, said first surface including said edge, and a prism fixing means capable of being coupled with said lens housing, said prism fixing means fixing a second surface of said prism, said second surface being opposite said edge.

2. An optical device assembly having a lens and a prism in one unit, comprising:

said lens incorporated into a lens housing, said prism, a stop means for positioning said prism, said stop means being fixed to said lens housing and being adapted to come into contact with an edge of said prism, a light projecting end surface of said lens housing adapted to come into contact with a first surface of said prism, said first surface including said edge, and a prism fixing means capable of being coupled with said lens housing, said prism fixing means fixing a second surface of said prism, said second surface being opposite said edge.

3. The assembly of claim 2 wherein said prism is a triangular prism, and wherein one prism surface is adapted to be used as a light incidence surface and another prism surface is adapted to be used as a light projection surface.

4. The assembly of claim 3 wherein said prism is capable of performing color separation and wherein a plurality of photoelectric conversion means are provided on said light projection surface, said conversion means being substantially one unit.

5. The assembly of claim 2 wherein said stop means is a positioning means for determining a vertical or horizontal position of said prism.

6. The assembly of claim 2 wherein said prism fixing means presses said second surface so that said first surface and said edge of said prism come in contact with said end surface of said lens barrel and said stop means, respectively, and said prism is set at a predetermined position.

* * * * *